United States Patent
McGowan et al.

(10) Patent No.: US 8,843,974 B2
(45) Date of Patent: Sep. 23, 2014

(54) MEDIA PLAYBACK SYSTEM WITH MULTIPLE VIDEO FORMATS

(76) Inventors: Albert John McGowan, Phoenix, AZ (US); Michael Edmund Godlewski, Mesa, AZ (US)

( * ) Notice: Subject to any disclaimer, the term of this patent is extended or adjusted under 35 U.S.C. 154(b) by 545 days.

(21) Appl. No.: 12/549,281

(22) Filed: Aug. 27, 2009

(65) Prior Publication Data

US 2010/0057782 A1 Mar. 4, 2010

Related U.S. Application Data

(60) Provisional application No. 61/092,236, filed on Aug. 27, 2008.

(51) Int. Cl.
*H04N 7/173* (2011.01)
*H04N 9/80* (2006.01)
*H04N 5/783* (2006.01)
*H04N 21/2387* (2011.01)

(52) U.S. Cl.
CPC .................................. *H04N 21/2387* (2013.01)
USPC ................. 725/88; 725/78; 725/86; 725/102; 725/114; 725/131; 725/46; 386/241

(58) Field of Classification Search
CPC .......... H04N 21/2387; H04N 21/4333; H04N 21/440218
USPC ............. 725/62, 78, 80, 86, 88, 89, 102, 114, 725/115, 131, 133, 141, 153, 29, 46; 386/241, 349, 350; 707/E17.009, 809
See application file for complete search history.

(56) References Cited

U.S. PATENT DOCUMENTS

| | | | |
|---|---|---|---|
| 5,721,829 A | 2/1998 | Dunn et al. | |
| 5,808,662 A | 9/1998 | Kinney et al. | |
| 5,818,439 A * | 10/1998 | Nagasaka et al. | ............... 725/87 |
| 5,884,056 A | 3/1999 | Steele | |
| 6,301,370 B1 | 10/2001 | Steffens et al. | |
| 6,711,741 B2 | 3/2004 | Yeo | |
| 6,721,490 B1 | 4/2004 | Yao et al. | |
| 7,127,735 B1 | 10/2006 | Lee et al. | |
| 7,149,359 B1 | 12/2006 | Omoigui | |
| 7,231,516 B1 | 6/2007 | Sparrell et al. | |

(Continued)

FOREIGN PATENT DOCUMENTS

JP 2005269411 A * 9/2005

OTHER PUBLICATIONS

Digital Video Multimedia Laboratory (DVMM Lab), WebSEEk—Web Image / Video Search Engine, webpages, Jun. 12, 2002, pp. 1-2.

(Continued)

*Primary Examiner* — Pinkal R Chokshi
(74) *Attorney, Agent, or Firm* — Kilpatrick Townsend & Stockton LLP

(57) ABSTRACT

Embodiments of the invention provide a process for a user viewing a media item. The process comprises the user viewing the media item on a first device in a first format, and the user pausing the media item at a stop time. The stop time is saved in the first format and a second format. The process further comprises the user choosing to view the media item on a second device requiring the second format. The media item is resumed in the second format from the saved stop time.

20 Claims, 1 Drawing Sheet

(56) References Cited

U.S. PATENT DOCUMENTS

| | | | |
|---|---|---|---|
| 7,302,490 | B1 | 11/2007 | Gupta et al. |
| 7,305,695 | B1 | 12/2007 | Ramakesavan |
| 7,327,708 | B2 | 2/2008 | Komandur et al. |
| 7,343,414 | B2 | 3/2008 | Lipscomb et al. |
| 7,401,351 | B2 | 7/2008 | Boreczky et al. |
| 7,788,686 | B1 * | 8/2010 | Andrews .................. 725/32 |
| 7,908,628 | B2 * | 3/2011 | Swart et al. .............. 725/93 |
| 7,958,530 | B2 * | 6/2011 | Fukuda et al. ............ 725/62 |
| 8,355,619 | B2 * | 1/2013 | Kato et al. .............. 386/241 |
| 8,365,235 | B2 * | 1/2013 | Hunt et al. .............. 725/88 |
| 8,601,515 | B2 * | 12/2013 | Sparrell ................. 725/58 |
| 2002/0092022 | A1 * | 7/2002 | Dudkicwicz et al. ....... 725/58 |
| 2005/0166258 | A1 * | 7/2005 | Vasilevsky et al. ........ 725/138 |
| 2005/0251835 | A1 | 11/2005 | Scott, III et al. |
| 2006/0015580 | A1 * | 1/2006 | Gabriel et al. ............ 709/219 |
| 2006/0156355 | A1 * | 7/2006 | Kawasaki et al. .......... 725/88 |
| 2006/0161635 | A1 * | 7/2006 | Lamkin et al. ............ 709/217 |
| 2007/0011709 | A1 * | 1/2007 | Katz et al. ............... 725/87 |
| 2007/0033533 | A1 * | 2/2007 | Sull ...................... 715/752 |
| 2007/0033623 | A1 | 2/2007 | Fredrickson et al. |
| 2007/0055999 | A1 | 3/2007 | Radom et al. |
| 2007/0061725 | A1 | 3/2007 | Isaac et al. |
| 2007/0078898 | A1 * | 4/2007 | Hayashi et al. .......... 707/104.1 |
| 2007/0081519 | A1 | 4/2007 | Ramaswamy et al. |
| 2007/0094691 | A1 | 4/2007 | Gazdzinski |
| 2007/0154169 | A1 * | 7/2007 | Cordray et al. ........... 386/83 |
| 2007/0157260 | A1 | 7/2007 | Walker |
| 2007/0199031 | A1 * | 8/2007 | Nemirofsky et al. ........ 725/88 |
| 2007/0203942 | A1 | 8/2007 | Hua et al. |
| 2007/0245243 | A1 | 10/2007 | Lanza et al. |
| 2007/0266410 | A1 * | 11/2007 | Balfanz et al. ............ 725/88 |
| 2007/0276927 | A1 | 11/2007 | Flinchem |
| 2008/0005348 | A1 | 1/2008 | Kosiba et al. |
| 2008/0005353 | A1 | 1/2008 | Panabaker et al. |
| 2008/0037489 | A1 | 2/2008 | Yitiz |
| 2008/0127255 | A1 | 5/2008 | Ress et al. |
| 2008/0129864 | A1 * | 6/2008 | Stone et al. .............. 348/468 |
| 2008/0154908 | A1 | 6/2008 | Datar et al. |
| 2008/0235733 | A1 * | 9/2008 | Heie et al. ............... 725/46 |
| 2009/0019489 | A1 * | 1/2009 | Ohlfs et al. .............. 725/44 |
| 2009/0060472 | A1 | 3/2009 | Bull et al. |
| 2009/0265742 | A1 * | 10/2009 | Schwartz et al. .......... 725/46 |
| 2009/0288131 | A1 * | 11/2009 | Kandekar et al. .......... 725/133 |
| 2010/0005137 | A1 * | 1/2010 | Kalama et al. ............ 709/203 |
| 2010/0017457 | A1 * | 1/2010 | Jumpertz et al. ........... 709/202 |
| 2010/0100899 | A1 * | 4/2010 | Bradbury et al. .......... 725/29 |
| 2011/0225417 | A1 * | 9/2011 | Maharajh et al. .......... 713/150 |
| 2011/0307548 | A1 * | 12/2011 | Fisk et al. ............... 709/203 |

OTHER PUBLICATIONS

Penelope Patsuris, Images Get Their Own Search Engine, webpages, May 4, 2004, pp. 1-3, Forbes.com.

Michael Kanellos and Stefanie Olsen, Search prototype gets the picture, webpages, Mar. 31, 2004, pp. 1-4, CNET News.

Ing. Fabio Sonnati, H.264 Encoding—Best Practices, Jun. 2008, pp. 1-23, Progetto Sinergia—White Papers.

Ing. Fabio Sonnati, Adobe Flash Video Technology, Jun. 2008, pp. 1-20, Progetto Sinergia—White Papers.

Evision Visual Search Technology, Content-Based Image and Video Search, webpages, pp. 1-5.

LTU Technologies, Video Matching, webpages, Aug. 12, 2009, pp. 1-2.

Fred Rothganger, Svetlana Lazebnik, Cordelia Schmid and Jean Ponce, Segmenting, Modeling, and Matching Video Clips Containing Multiple Moving Objects, article, pp. 1-16.

Tat-Jun Chin, James U, Konrad Schindler, David Suter, Monash University, Face Recognition from Video by Matching Image Sets, article, pp. 1-7.

Omnivideo, Video Search, are we there yet?, webpages, pp. 1-5.

Loren Baker, Google, Neven Vision & Image Recognition, webpages, pp. 1-10, Aug. 15, 2006, Search Engine Journal.

Stefanie Olsen, Google snaps up photo-technologist Neven Vision, webpage, Aug. 15, 2006, p. 1, CNET News.

* cited by examiner

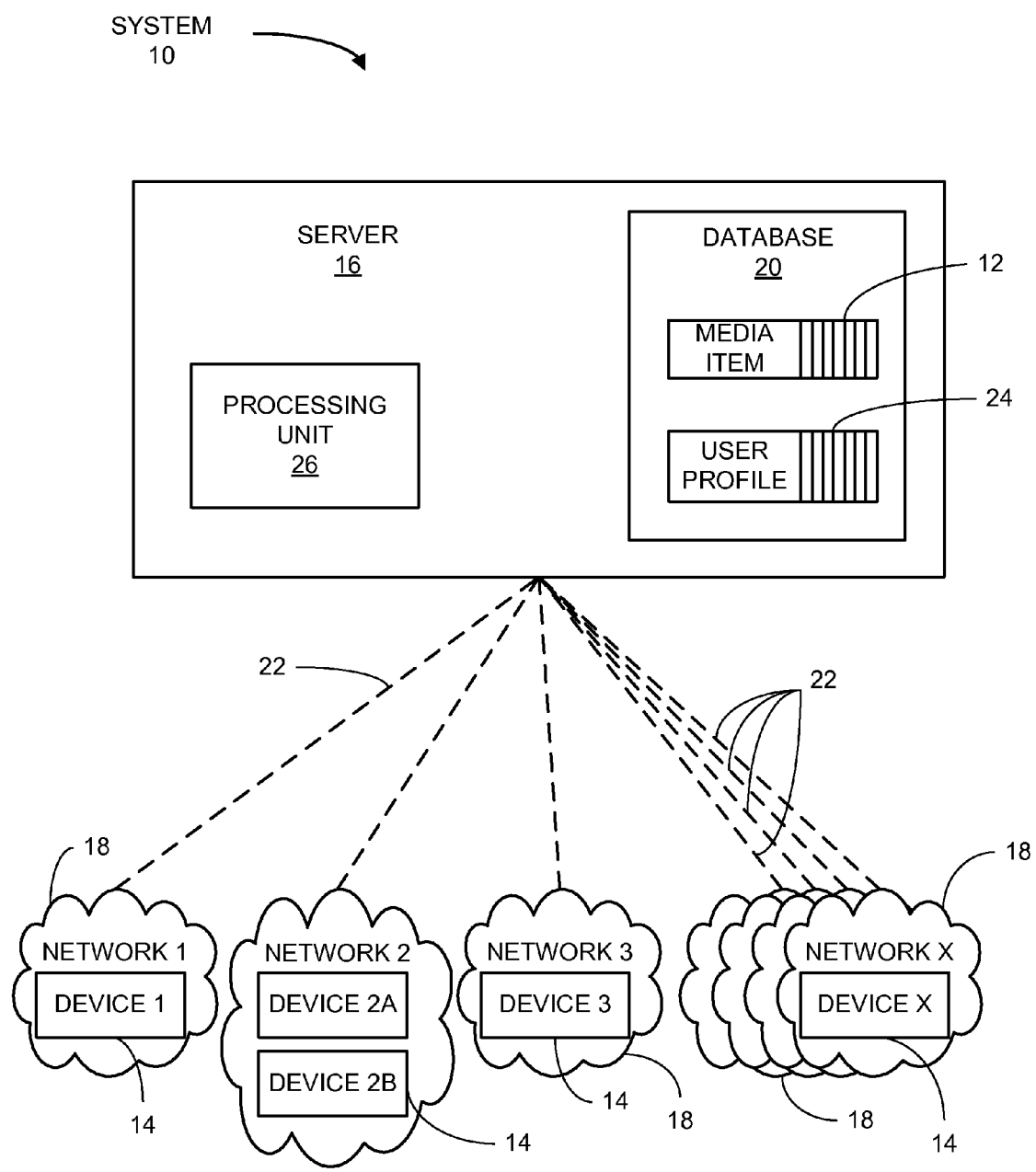

MEDIA PLAYBACK SYSTEM WITH MULTIPLE VIDEO FORMATS

RELATED APPLICATIONS

This application claims priority under 35 U.S.C. §119 to U.S. Provisional Patent Application No. 61/092,236 filed on Aug. 27, 2008, the entire contents of which is incorporated herein by reference.

BACKGROUND

There are many disparate methods of accessing a media item such as a TV show or a movie. Some methods include the following: watching a stream directly from a website such a Hulu.com or Youtube; watching a video from a handheld device such as an iPhone® or Windows Media® enabled phone; watching from a device connected to a traditional television in a home such as a computer connected directly to a TV or a device created specifically for delivering video to the TV such as those manufactured by D-Link® or Netgear®; or watching a media item though a service that is delivered to a television directly or through the use of a set top box device. These methods can be accessed via an Internet Protocol (IP), a traditional Over The Air (OTA) or wireless solution, including terrestrial broadcast solutions and solutions known as Wimax or WiFi, Satellite Broadcast (SB), or another wired type solution such as cable television.

SUMMARY

Some embodiments of the invention provide a process including a user viewing a media item through at least one of a first device and a second device. The process comprises providing a database that stores the media item in a first format and a second format, the user choosing to view the media item on the first device, and a processing unit determining the first format is necessary to view the media item on the first device. The process also comprises the user pausing the media item on the first device in the first format at a stop time and the processing unit saving the stop time of the media item in the first format and the second format in the database. The process further comprises the user choosing to view the media item on the second device and the processing unit determining the second format is necessary to view the media item on the second device, retrieving the second format from the database, and playing the second format on the second device from the saved stop time.

Some embodiments of the invention provide a system for a user to view a media file through at least one of a first device and a second device. The system comprises a database that stores the media file in a first format and a second format and a processing unit that determines which of the first format and the second format is necessary to view the media file on at least one of the first device and the second device. The system further comprises a system memory for saving a stop time of the media file in the first format and the second format in the database such that the media file can be resumed at the stop time in one of the first format on the first device and the second format on the second device.

DESCRIPTION OF THE DRAWINGS

FIG. 1 is a perspective view of a system that can allow playback of media items on various devices, according to one embodiment of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a system 10 according to one embodiment of the invention. The system 10 can provide media items 12, such as videos of movies or television shows, for a user to view. The system 10 can have the ability to pause and resume a media item 12 across multiple disparate platforms and devices 14. Specifically, the system 10 can allow the user to pause a media item 12 while watching it on one device 14 and resume the media item 12 on a different device 14 at the same location in the media item 12, regardless of the file format required for the media item 12 to be viewed on the device 14.

The system 10 can include a server 16 in communication with devices 14 on one or more networks 18. The server 16 can also include at least one database 20. The database 20 can store a plurality of media items 12 in various formats (e.g., Flash, Quicktime, Windows Media files, etc.). Specifically, the same media item 12 (i.e., a particular movie) can be stored in the database 18 in more than one format.

The user can log into the system 10 through a device 14 connected to the server 16 via network connections 22. In some embodiments, examples of devices 14 can include, but are not limited to, a smartphone (such as an iPhone, Blackberry, or a Palm Pre), a television set in connection with a set top box device (e.g., TiVo®) or a home network (e.g., through D-Link® or Netgear®), and a computer in connection with a video viewing website (such as Netflix®).

An example of a network 18 can include the internet. Another example of a network 18 for devices 14 such as smartphones can be a 3G network. Some examples of network connections 22 can include traditional Over The Air (OTA) or wireless connections, including terrestrial broadcast solutions and solutions known as Wimax or WiFi, Satellite Broadcast (SB), or another wired type solution such as cable television.

The user can have an account with the system 10 in order to search and view media files 12. The system 10 can then store a user profile 24 including user account information such as log in information, user information, user viewing history information, user search history, etc. in the database 20. The user viewing history information can include resume records of various media items, as described below.

Once logged into the system 10, the user can search the database 20 for specific media items 12 to view. The user can then choose to view a first media item 12 on their device 14. The user can have the options to play, pause, fast forward, and rewind the first media item 12, similar to a videocassette player or digital video recorder system. However, if the user pauses the first media item 12, the system 10 can present a "resume later" option. If the resume later option is selected, the server 16 can record information about the first media item 12 and the user in the database 20. For example, some information can include the name of the first media item 12, a timestamp of when the first media item 12 was paused (i.e., the resume point) and/or a screenshot of the time-stamped resume point in the first media item 12. Such information can be considered the resume record for the media item 12 and can be recorded in a system memory (not shown) under the user profile 24. The resume record can be determined and recorded by a processing unit 26 on the server 16. In some embodiments, the system memory can be the database 20.

In addition to recording the resume point in the first media item 12 viewed, the system 10 can also recall all file formats of the first media item 12 stored in the database 20, and save resume points for each different file format under the resume record. In one embodiment, the system 10 can determine the resume points in different file formats using the elapsed time to the resume point in the first file format originally viewed.

In some embodiments, the resume record will not include the device 14 that the media item 12 was played on or the specific format the media item 12 was played with since that data may not be relevant to the later resumption of the media item 12. Instead, the resume record can simply include the resume point in all file formats. Further, the resume record does not have to include each entire file of the media item 12 in the user profile 24. Rather, only the name of the media item 12 and the resume point in all file formats can be necessary. This can allow the database 20 to only require one file for each format of a media item 12 in a common space, instead of multiple user profiles 24 in the database 20 having the same file, which greatly conserves storage space in the database 20.

After the information is recorded, the user can further search for more media items 12 or log out of the system 10. If the user chooses to view a second media item 12, the recorded information about the first media item 12 can still be saved in the database 20 and will not be affected. In addition, the user can pause the second media item 12, choose the resume later option, and information about the second media item 12 can be recorded in the database 20 without affecting the information recorded about the first media item 12. The user can then further search for more media items 12 or log out of the system 10. The user can also go back to the first media item 12 and resume viewing the first media item 12 from its paused position or from the beginning.

When the user logs out of the system 10, the user's resume records can still be saved in the database 20 under their user profile 24. Therefore, when the user logs back into the system 10, the user has the ability to view the saved media items 12 from their respective resume points. Because the system 10 recorded the resume point for the media item 12 in all file formats, the user is able to log into the system 10 using a second device 14 (e.g., device 3 in FIG. 1) with a different operating system 10 than a first device 14 (e.g., device 1 in FIG. 1) and still view the media item 12 from the resume point regardless of the file format required.

The system 10 can be used with virtually any device 14 that supports streaming video and can be connected to a network 18. In order to determine which file format is compatible with the device 14 being used, the processing unit 26 on the server 16 can perform a speed test (e.g., a bandwidth speed test) to determine the type of device 14 and an appropriate bandwidth the device 14 is capable of using. From this determination, the processing unit 26 can communicate with the database 20 to locate and restore the appropriate video format for viewing the media item 12.

The following paragraphs illustrate a first example use of the system 10 according to one embodiment of the invention.

A user logs into the system 10 via a web site while using their computer at work. The user selects a video (i.e., the media item 12) to watch and the system 10 (e.g., the processing unit of the system 10) uses a speed test to check the bandwidth and the type of device 14 the user is connecting from (i.e., the computer). The system 10 then selects the appropriate video format and bitrate to deliver the highest possible watching experience for the user. In this case, it is a Flash Video format at 1 megabit per second (Mbps) since, for example, the bandwidth is limited in the office. The media item 12 can then be played at the equivalent of 720p (a middle quality high definition, or HD, resolution).

The user then pauses the media item 12 and logs off the system 10. The system 10 stores the resume record of the media item 12 in the database 20. At this time the system 10 determines the resume point in all the various video file formats available for the media item 12 in the database 20. All of the resume points are stored within the resume record under the user's user profile 24 in the database 20 for future use.

The user travels home on a bus from work and logs back into the system 10 on their iPhone®, for example, using an iPhone application for the system 10. The system 10 determines the user is on an iPhone® based on the information gleaned from the user logging in with the iPhone application. The user selects to resume watching the media item 12 they were previously watching. In this case, the iPhone can support a Quicktime video format, but using a variable bitrate version since the user is connected via a 3G network whose bandwidth may ebb and flow and therefore support anything from 480p to 1080p (Low HD to High HD). Since the system 10 has already determined the resume point of the media item 12 in those file formats prior to the user requesting it, the playback of the media item 12 at the resume point can be nearly instantaneous. The system 10 therefore chooses the Quicktime formatted version of the media item 12, selects the variable bitrate, and resumes the media item 12 for the user to view on their device 14.

The user arrives at his bus stop and again pauses the media item 12. The system 10 can again record the resume point for the media item 12 and creates a new resume record. The new resume record, as well as the old resume record, for the media item 12 can be saved in the database 20 under the user's profile 24. The user then logs out of the system 10.

The user returns home and turns on their television that has a TiVo device connected to it. The TiVo device 14 can be connected to the system 10 via a network connection 22. Therefore, the user can log into the system 10 from their TiVo device and select to resume the media item 12. The system 10 determines the user has signed in through the TiVo device and the large amount of broadband bandwidth available and therefore selects a full h.264 MPG2 version of the media item at 15 Mbps (Full 1080p HD with 5.1 or 7.1 audio) and resumes the playback at the resume point. Since the system 10 had already determined the resume point of the media item 12 in that file format prior to the user requesting it, the playback of the media item 12 can be near instantaneous.

The following paragraphs illustrate a second example use of the system 10 according to one embodiment of the invention.

A user begins watching a two hour long media item 12 on their computer at their office. They are using a desktop computer utilizing Flash technology. The media item 12 is a long form video and the individual does not have enough time to finish watching the media item 12. The individual selects the pause button in the Flash media player and is presented with the resume later option. Once selected, the system 10 stores the resume record, the individual logs out of the system 10 and travels to the train station to return home.

On the way, the user logs back into the system 10 on their Blackberry™ equipped with Windows Media Player. The user selects the media item 12 for resumption and the system 10 recognizes the media item 12 should be delivered in WMA format instead of Flash based on the new device 14 (i.e., the Blackberry™). The system 10 draws the WMA file from the database 20 and navigates to the resume point as saved in the resume record. The system 10 then resumes playback of the media item 12 at the resume point.

At the end of the user's commute on the train, the media item 12 has still not finished so the user repeats the process of pausing the media item and having a resume record saved in the database 20 under the user's profile 24. Both the newly created resume record and the previous resume record can be stored in the database 20.

Upon arriving at home, the user logs back into the system 10 via their Windows Media Center PC connected to their television. Navigating the system 10, the individual again selects to resume the media item 12 they were watching and the system 10 delivers the media item 12 from the resume point in WMA format.

In another embodiment of the invention, the resume record can include a snapshot view of the media item 12 at the resume point. When the system 10 retrieves the media item 12, the system 10 can use the snapshot in addition to, or rather than, the recorded time elapsed to ensure the resume point is correct. The system 10 can match an exact frame in the media item 12 to the snapshot previously saved, regardless of the formats used in the current or previous sessions. This can be helpful when different file formats are encoded slightly different and resuming at a time elapsed resume point may present different points in the media item 12 across different file formats.

According to another embodiment of the invention, a resume record can be established even when the media item 12 was not viewed on the system 10. This embodiment can utilize the frame matching technique described above. The following paragraphs illustrate an example use of the system 10 according to this embodiment of the invention.

A user can watch a media item 12 at a public gathering place or other such location in a manner that they are not logged into the system 10. The user must leave the viewing of the media item 12 prior to its completion. The user has a digital camera available for use and takes a picture of the image on the screen. Once the user comes to a location that has access to the system 10 (e.g., via a network 18), they can log into the system 10 and upload the image from the media item 12. The system 10 can then use the snapshot to search frames of media items 12 in the database 20 to find the exact media item 12.

In addition, media items 12 in the system 10 can include peripheral information (in text form). Therefore, the user can include the title of the media item 12, if known. If not known, a partial title, specific actor, director or any other peripheral information that can be entered into the system 10 to narrow down the media item 12 being searched for can be loaded.

If the exact title is known, the system 10 can retrieve the media item 12 from the database 20. If the exact title is not known, the system 10 can incorporate all the peripheral information entered by the user and perform a search. More peripheral information entered can make it easier for the system 10 to find the media item 12, and therefore can substantially reduce the search time needed.

Once the system 10 finds the correct media item 12, it can use a visual search algorithm, such as the visual search method developed by Google®, to locate the exact location of the image within the media item 12. Once located, the system 10 can launch the media item 12 at the exact location of the captured image and the individual can resume their viewing experience.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

The invention claimed is:

1. A system for allowing playback of a media file using at least one of a first device or a second device, the system comprising:
   a database that stores the media file in a first format and a second format, where the first format can be played on the first device and the second format can be played on the second device; and
   a processing unit that determines which of the first format and the second format to provide for viewing the media file using at least one of the first device and the second device;
   a memory for saving information indicating a resume point of the media file associated with a user profile, wherein the information indicates the resume point in the first format and separately indicates the resume point in the second format such that the media file can be resumed at the resume point in one of:
      the first format using the first device, and
      the second format using the second device.

2. The system for allowing playback of the media file using the at least one of the first device or the second device, as recited in claim 1, wherein the memory is configured to store the information indicating the resume point in a record, the record further including a name of the media file.

3. The system for allowing playback of the media file using the at least one of the first device or the second device, as recited in claim 2, wherein:
   the database is configured to store a plurality of media files; and
   the memory is further configured to store a plurality of records, wherein each record corresponds to a different media file.

4. The system for allowing playback of the media file using the at least one of the first device or the second device, as recited in claim 3, wherein the plurality of records is associated with a user profile including at least one data item from a group of data items consisting of:
   user account information,
   user viewing history information, and
   user search history.

5. The system for allowing playback of the media file using the at least one of the first device or the second device, as recited in claim 1, wherein:
   the media file includes images; and
   the memory is further configured to store a screenshot of the media file, the screenshot corresponding to an image of the media file at the resume point.

6. The system for allowing playback of the media file using the at least one of the first device or the second device, as recited in claim 1, wherein the processing unit is further configured to:
   receive an indication that playback of the media file has been stopped; and
   determine the resume point of the media file in the first format and the second format based, at least in part, on the receiving the indication that the playback of the media file has been stopped.

7. The system for allowing playback of the media file using the at least one of the first device or the second device, as recited in claim 6, wherein the processing unit determines the resume point of the media file after receiving an indication that an option to resume playback at a later point in time has been selected.

8. The system for allowing playback of the media file using the at least one of the first device or the second device, as recited in claim 1, wherein the processing unit is further configured to determine one or both of:
   a bandwidth associated with playback of the media file with using the first device, or
   a bandwidth associated with playback of the media file with using second device.

9. The system for allowing playback of the media file using the at least one of the first device or the second device, as recited in claim 1, wherein the processing unit is further configured to determine one or both of:
   a type of device of the first device, or
   a type of device of the second device.

10. A process for allowing playback of a media file to be stopped using a first device and resumed using a second device, the process comprising:
   receiving, with a network interface, a request to view the media file on the first device;
   determining to provide the media file to the first device using a first format;
   providing, via the network interface, the media file in the first format to the first device;
   receiving an indication that playback of the media file on the first device has been stopped;
   automatically generating, with a processor, information related to a resume point of the media file, based on the indication that the playback of the media file on the first device has been stopped, wherein the information indicates the resume point in the first format and separately indicates the resume point in the second format;
   associating the information related to the resume point of the media file with a user profile;
   storing the information related to the resume point of the media file;
   receiving, with the network interface, a request to view the media file on the second device, wherein the request to view the media file on the second device is associated with the user profile;
   determining to provide the media file to the second device using a second format;
   retrieving, for the media file in the second format, the information related to the resume point; and
   providing, via the network interface, the media file in the second format to the second device such that playback of the media file using the second device can begin at a point in the media file corresponding to the resume point.

11. The process for allowing playback of the media file to be stopped using the first device and resumed using the second device, as recited in claim 10, further comprising providing a database in which the media file is stored in the first format and the second format.

12. The process for allowing playback of the media file to be stopped using the first device and resumed using the second device, as recited in claim 10 allowing for playback of a plurality of media files, further comprising storing a plurality of records wherein each record corresponds to a different media file.

13. The process for allowing playback of the media file to be stopped using the first device and resumed using the second device, as recited in claim 12, further comprising:
   receiving a search query; and
   searching the plurality of records based, at least in part, on the search query.

14. The process for allowing playback of the media file to be stopped using the first device and resumed using the second device, as recited in claim 10, further including creating a record having information related to a resume point, wherein the creating includes determining, for the media file in both the first and second formats, the resume point.

15. The process for allowing playback of the media file to be stopped using the first device and resumed using the second device, as recited in claim 14, wherein the determining further includes using a recorded time elapsed.

16. The process for allowing playback of the media file to be stopped using the first device and resumed using the second device, as recited in claim 14, wherein:
   the media file includes images; and
   the determining further includes using a snapshot of the media file to find the resume point.

17. A non-transitory computer-readable medium for allowing playback of a media file to be stopped using a first device and resumed using a second device, the computer-readable medium having instructions which, when executed by a computer, cause the computer to:
   receive a request to view the media file on the first device;
   determine to provide the media file to the first device using a first format;
   provide the media file in the first format to the first device;
   receive an indication that playback of the media file on the first device has been stopped;
   generate information related to a resume point of the media file, based on the indication that the playback of the media file on the first device has been stopped, wherein the information indicates the resume point in the first format and separately indicates the resume point in the second format;
   associate the information related to the resume point of the media file with a user profile;
   store the information related to the resume point of the media file;
   receive a request to view the media file on the second device, wherein the request to view the media file on the second device is associated with the user profile;
   determine to provide the media file to the second device using a second format;
   retrieve, for the media file in the second format, the information related to the resume point; and
   provide the media file in the second format to the second device such that playback of the media file using the second device can begin at a point in the media file corresponding to the resume point.

18. The non-transitory computer-readable medium for allowing playback of a media file to be stopped using the first device and resumed using a second device, as recited in claim 17, wherein the providing the media file in the first and second formats comprises streaming the media file.

19. The non-transitory computer-readable medium for allowing playback of a media file to be stopped using the first device and resumed using a second device, as recited in claim 17, wherein the media file is one of a plurality of media files, further including instructions which, when executed by a computer, cause the computer to:
   receive a search query; and
   search the plurality of media files using the search query.

20. The non-transitory computer-readable medium for allowing playback of a media file to be stopped using the first device and resumed using a second device, as recited in claim 19, wherein the search query comprises an image.

* * * * *